United States Patent
Tononishi

(10) Patent No.: US 10,361,037 B2
(45) Date of Patent: Jul. 23, 2019

(54) ENERGY STORAGE APPARATUS

(71) Applicant: GS Yuasa International Ltd., Kyoto-shi (JP)

(72) Inventor: Masamitsu Tononishi, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 253 days.

(21) Appl. No.: 15/261,692

(22) Filed: Sep. 9, 2016

(65) Prior Publication Data
US 2017/0084886 A1 Mar. 23, 2017

(30) Foreign Application Priority Data
Sep. 18, 2015 (JP) .................................. 2015-186037

(51) Int. Cl.
| | |
|---|---|
| *H01M 2/10* | (2006.01) |
| *H01G 9/008* | (2006.01) |
| *H01M 2/02* | (2006.01) |
| *H01G 11/10* | (2013.01) |
| *H01G 11/78* | (2013.01) |
| *H01G 11/82* | (2013.01) |
| *H01M 2/20* | (2006.01) |

(52) U.S. Cl.
CPC ............. *H01G 9/008* (2013.01); *H01G 11/10* (2013.01); *H01G 11/78* (2013.01); *H01G 11/82* (2013.01); *H01M 2/02* (2013.01); *H01M 2/10* (2013.01); *H01M 2/1077* (2013.01); *H01M 2/20* (2013.01); *H01M 2/206* (2013.01); *H01M 2220/20* (2013.01)

(58) Field of Classification Search
CPC ............ H01M 2/02; H01M 2/10; H01M 2/20; H01M 2/1077; H01M 2/206; H01M 2220/20; H01G 9/008; H01G 9/08
See application file for complete search history.

(56) References Cited

U.S. PATENT DOCUMENTS

| | | | |
|---|---|---|---|
| 8,586,235 B2 | 11/2013 | Jeon et al. | |
| 8,603,666 B2 | 12/2013 | Nagamine et al. | |
| 2005/0202311 A1* | 9/2005 | Higashino | H01M 2/1077 429/99 |

(Continued)

FOREIGN PATENT DOCUMENTS

| | | | |
|---|---|---|---|
| JP | 2007-042648 A | 2/2007 | |
| JP | 2008-277050 A | 11/2008 | |

(Continued)

OTHER PUBLICATIONS

JP2015099648MT (Year: 2015).*

*Primary Examiner* — Alexander Usyatinsky
(74) *Attorney, Agent, or Firm* — McGinn I.P. Law Group, PLLC.

(57) ABSTRACT

An energy storage apparatus includes: an energy storage device; an outer covering; an end plate which is disposed on a side of the energy storage device and is fixed to the outer covering; and a binding member which is mounted on the end plate and applies a binding force to the energy storage device. The end plate includes a first region on which the binding member is mounted, a second region which is fixed to the outer covering, and a third region which differs from the first region and the second region and has higher rigidity than the first region and the second region.

7 Claims, 9 Drawing Sheets

(56) References Cited

U.S. PATENT DOCUMENTS

| | | | |
|---|---|---|---|
| 2007/0026305 A1 | 2/2007 | Jeon et al. | |
| 2010/0297486 A1* | 11/2010 | Fujii | H01M 10/625 |
| | | | 429/120 |
| 2011/0090666 A1* | 4/2011 | Rupert | H01M 10/486 |
| | | | 361/829 |
| 2012/0315508 A1* | 12/2012 | Kurita | H01M 2/1077 |
| | | | 429/7 |
| 2014/0030566 A1* | 1/2014 | Lee | H01M 2/1016 |
| | | | 429/90 |
| 2016/0240827 A1* | 8/2016 | Sakurai | H01M 2/1077 |

FOREIGN PATENT DOCUMENTS

| | | |
|---|---|---|
| JP | 2010-272251 A | 12/2010 |
| JP | 2010-272517 A | 12/2010 |
| JP | 2013-179094 A | 9/2013 |
| JP | 2013-229182 A | 11/2013 |
| JP | 2014-192120 A | 10/2014 |
| JP | 2015-099648 A | 5/2015 |
| JP | 2015099648 * | 5/2015 |

* cited by examiner

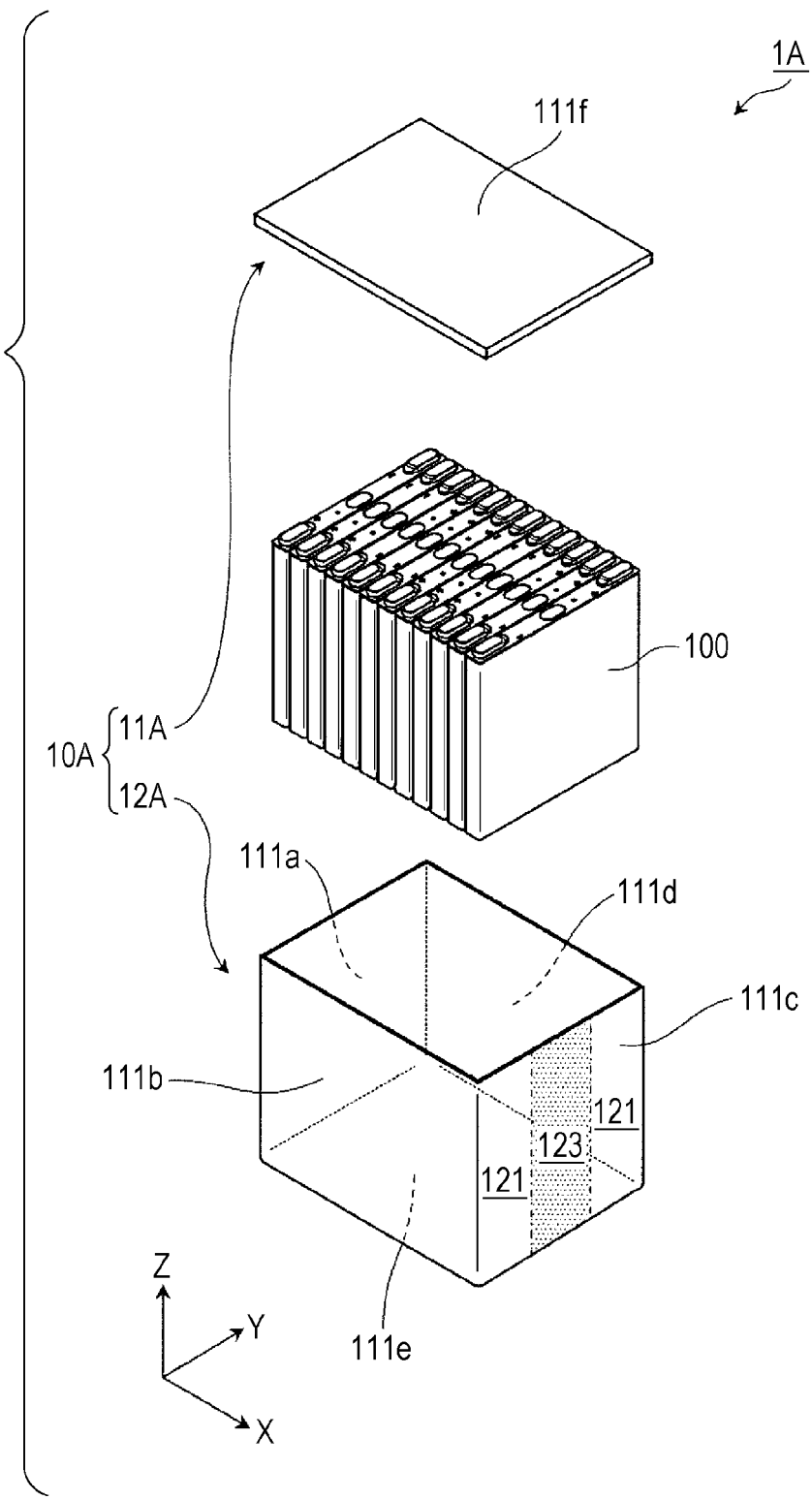

ENERGY STORAGE APPARATUS

CROSS-REFERENCE TO RELATED APPLICATIONS

This application claims the benefit of Japanese patent application No. 2015-186037, filed on Sep. 18, 2015, which is incorporated by reference.

FIELD

The present invention relates to an energy storage apparatus provided with an energy storage device and an outer covering.

BACKGROUND

Conventionally, as an energy storage apparatus provided with energy storage devices, there has been known the configuration where energy storage devices are sandwiched by plates (end plates) (see JP 2010-272251 A, for example). In such an energy storage apparatus, the pair of plates sandwiches the energy storage devices by a binding force applied by bind bars (binding members) mounted on the pair of plates.

In the above-mentioned conventional configuration, the end plates are held in a state where a binding force generated by the binding member is applied to the energy storage devices and hence, there may be a case where deformation such as deflection occurs in the end plates.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention to provide an energy storage apparatus which can suppress the deformation of end plates.

According to an aspect of the present invention, there is provided an energy storage apparatus which includes: an energy storage device; an outer covering; an end plate which is disposed on a side of the energy storage device and is fixed to the outer covering; and a binding member which is mounted on the end plate and applies a binding force to the energy storage device, wherein the end plate includes a first region on which the binding member is mounted, a second region which is fixed to the outer covering, and a third region which differs from the first region and the second region and has higher rigidity than the first region and the second region.

BRIEF DESCRIPTION OF DRAWINGS

The foregoing and other features of the present invention will become apparent from the following description and drawings of an illustrative embodiment of the invention in which:

FIG. 9 is an exploded perspective view showing constitutional elements of an energy storage apparatus according to a modification.

DESCRIPTION OF EMBODIMENTS

Figure 1:
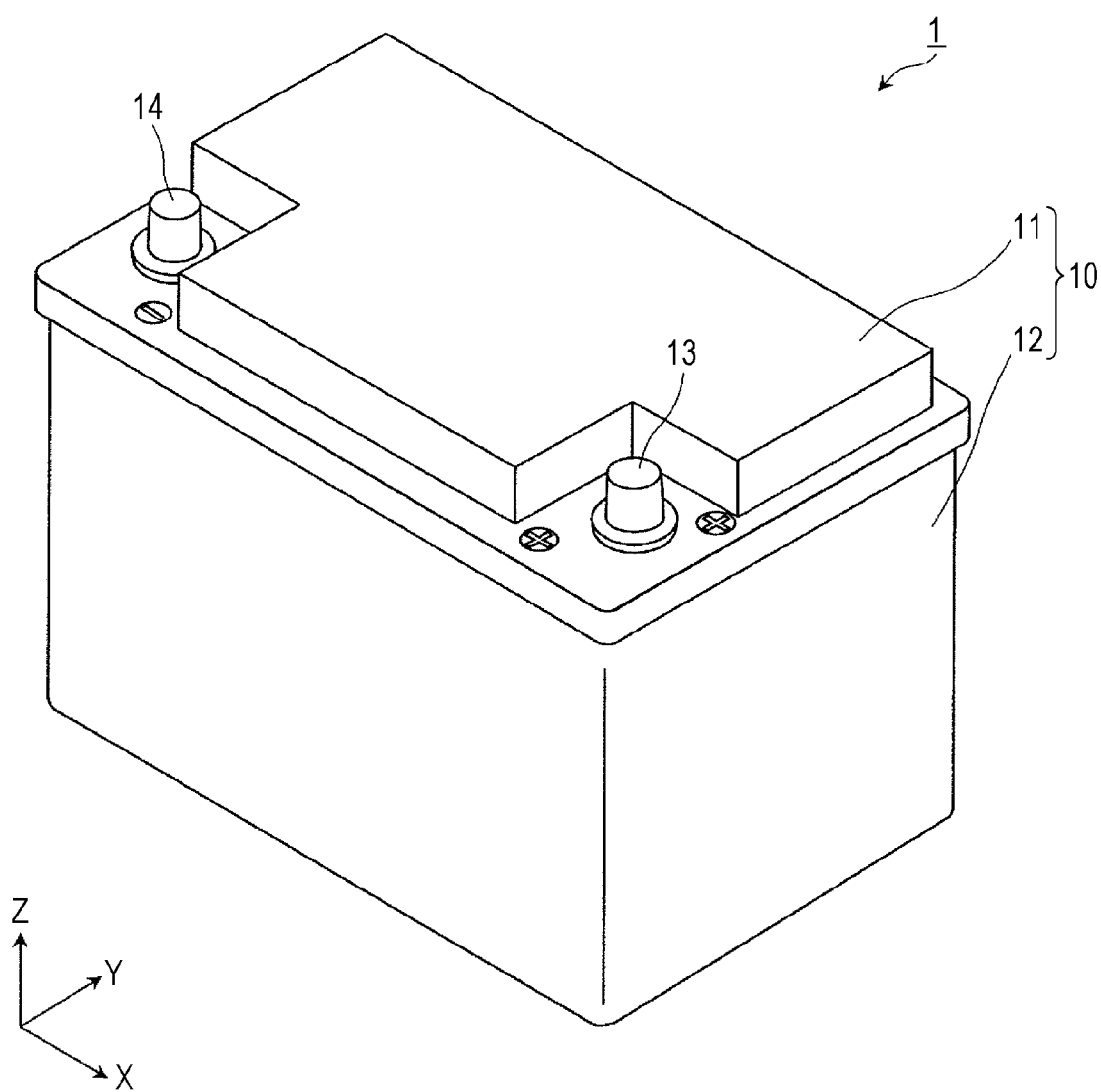
FIG. 1 is a perspective view showing an external appearance of an energy storage apparatus according to an embodiment.

According to an aspect of the present invention, there is provided an energy storage apparatus which includes: an energy storage device; an outer covering; an end plate which is disposed on a side of the energy storage device and is fixed to the outer covering; and a binding member which is mounted on the end plate and applies a binding force to the energy storage device, wherein the end plate includes a first region on which the binding member is mounted, a second region which is fixed to the outer covering, and a third region which differs from the first region and the second region and has higher rigidity than the first region and the second region.

Since the binding member is mounted on the first region, the deformation of the first region is suppressed by the binding member. Since the outer covering is fixed to the second region, the deformation of the second region is suppressed by the outer covering. That is, both the deformation of the first region and the second region are suppressed by the other members which are connected to the end plate. The third region which differs from the first region and the second region has higher rigidity than the first region and the second region and hence, the deformation of the third region is suppressed by the rigidity of the end plate per se without relying on other members. Since all of the deformation of the first region, the second region and the third region are suppressed, the deformation of the end plate can be suppressed.

The third region may be formed of a plurality of plate members which are made to overlap with each other.

With such a configuration, the third region is formed of the plurality of plate members which are made to overlap with each other and hence, the rigidity of the third region can be increased with the simple configuration.

A strip-like projecting portion may be formed on the third region.

With such a configuration, the strip-like projecting portion is formed on the third region and hence, the rigidity of the third region can be increased while the increase of a material and a weight of the end plate are suppressed.

The projecting portion may be formed in an extending manner from the first region to the second region.

With such a configuration, the projecting portion is formed in an extending manner from the first region to the second region and hence, the rigidity of the third region can be further increased.

The outer covering may have a recessed portion which is recessed toward the end plate, and the second region may be disposed at a position corresponding to the recessed portion and may be fixed to the recessed portion.

With such a configuration, the second region is disposed at a position corresponding to the recessed portion of the outer covering and hence, the second region is positioned more inner side of the outer covering compared to a case where the outer covering has no such recessed portion. Accordingly, in the case where the third region is positioned between the first region and the second region, a size of the third region can be made small. As a result, the deformation which occurs on the third region when a stress is applied thereto can be further suppressed.

According to another aspect of the present invention, there is provided an energy storage apparatus which includes: an energy storage device; an outer covering; an end plate which is disposed on a side of the energy storage device; and a binding member which is mounted on the end plate and applies a binding force to the energy storage device, wherein the end plate has a first region where the binding member is mounted and a third region which differs from the first region and has higher rigidity than the first region.

Since the binding member is mounted on the first region, the deformation of the first region is suppressed by the binding member. That is, the deformation of the first region is suppressed by other members connected to the end plate. The third region which differs from the first region has higher rigidity than the first region and hence, the deformation of the third region is suppressed by the rigidity of the end plate per se without relying on other members. Both the deformation of the first region and the third region are suppressed and hence, the deformation of the end plate can be suppressed.

The energy storage apparatus of the present invention can suppress the deformation of the end plate.

Hereinafter, an energy storage apparatus according to an embodiment of the present invention is described with reference to drawings. The embodiment described hereinafter is one preferred specific example of the present invention. In the embodiment described hereinafter, numerical values, shapes, materials, constitutional elements, the arrangement positions and connection states of the constitutional elements and the like are merely examples, and these are not intended to limit the present invention. Further, out of the constitutional elements in the embodiment described hereinafter, the constitutional elements which are not described in independent claims describing an uppermost concept are described as arbitrary constitutional elements. In the respective drawings, the respective constitutional elements are not described strictly accurately in size or the like.

Embodiment

First, a configuration of an energy storage apparatus 1 is described.

Figure 2:
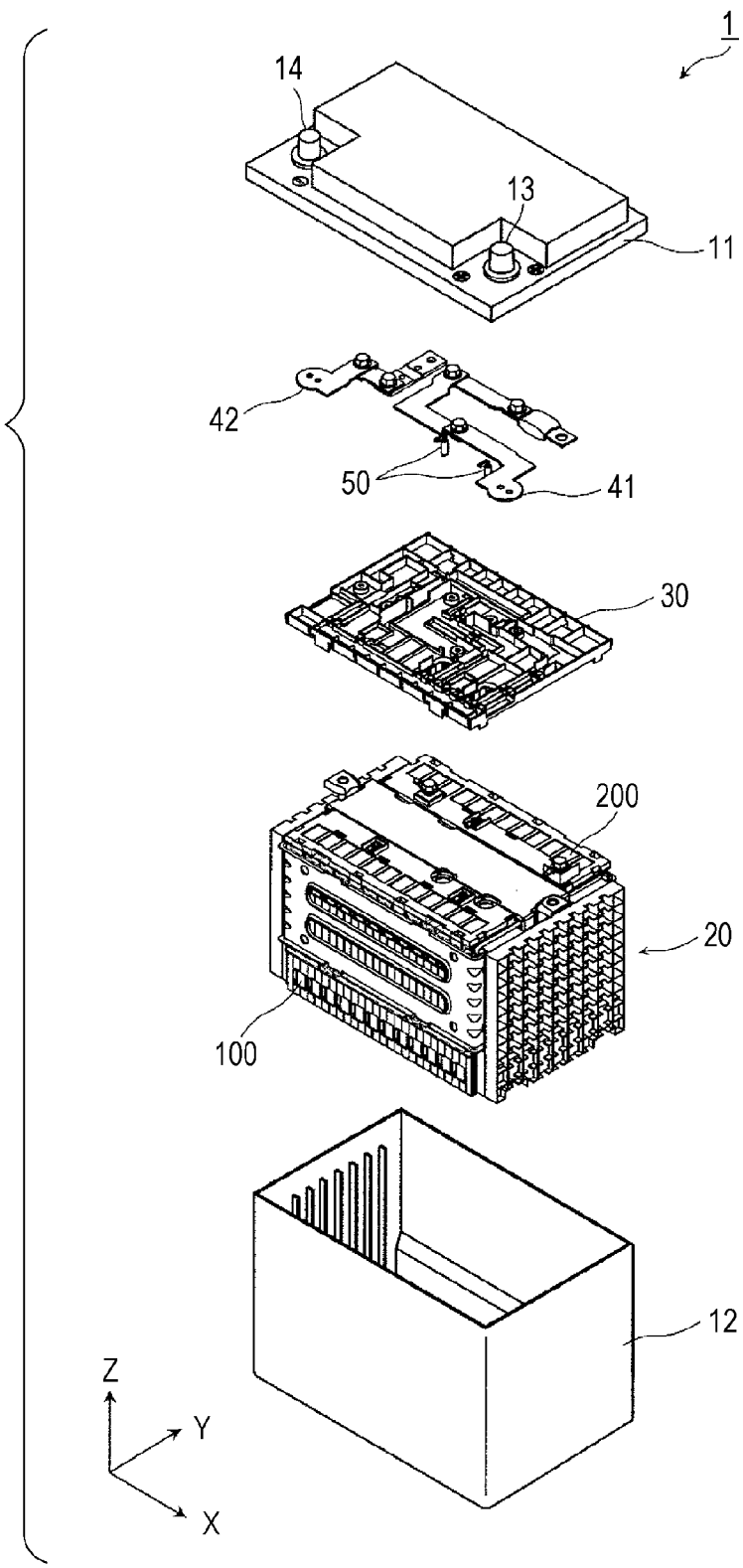
FIG. 2 is an exploded perspective view showing constitutional elements of the energy storage apparatus.

FIG. 1 is a perspective view showing an external appearance of the energy storage apparatus 1 according to an embodiment of the present invention. FIG. 2 is an exploded perspective view showing constitutional elements of the energy storage apparatus 1.

In these drawings, the Z axis direction is indicated as the vertical direction, and the description is made hereinafter using the Z axis direction as the vertical direction. However, there may be also a case where the Z axis direction is not the vertical direction depending on a mode of use and hence, the Z axis direction is not limited to the vertical direction. The same goes for drawings which are referenced hereinafter.

The energy storage apparatus 1 is an apparatus which can charge electricity from the outside of the energy storage apparatus 1 therein or can discharge electricity to the outside of the energy storage apparatus 1. For example, the energy storage apparatus 1 may be a battery module used for power storage application, power source application or the like. As shown in FIG. 1 and FIG. 2, the energy storage apparatus 1 includes: an outer covering 10 formed of a first outer covering 11 and a second outer covering 12; and an energy storage unit 20, a holder 30, bus bars 41, 42, thermistors 50 and the like which are housed in the outer covering 10.

The outer covering 10 is a container (module case) having a rectangular shape (box shape) which forms an outer covering of the energy storage apparatus 1. That is, the outer covering 10 is disposed outside the energy storage unit 20, the holder 30, the bus bars 41, 42 and the thermistors 50 and allows the energy storage unit 20 and the like to be disposed at predetermined positions in the outer covering 10 thus protecting the energy storage unit 20 and the like from an impact or the like. In this embodiment, for example, the outer covering 10 is made of an insulating resin material such as polycarbonate (PC), polypropylene (PP), polyethylene (PE), a polyphenylene sulfide resin (PPS), polybutylene terephthalate (PBT) or an ABS resin. The outer covering 10 prevents the energy storage unit 20 and the like from coming into contact with a metal member or the like disposed outside the outer covering 10.

The energy storage apparatus 1 of this embodiment is preferably used as a vehicle-mounted energy storage apparatus. However, the energy storage apparatus 1 is not limited to such an energy storage apparatus. In this embodiment, the outer covering 10 is formed to have the same size and the same shape as an outer covering of a vehicle-mounted lead-acid battery. That is, the energy storage apparatus 1 is configured to be replaceable with the lead-acid battery. The energy storage apparatus 1 outputs, for starting an engine of a vehicle, a voltage of approximately 12 V in a state where the energy storage unit 20 is fully charged.

An output from the energy storage apparatus 1 may be used for, besides starting an engine, supplying electricity to accessories or assisting driving of a vehicle. The energy storage apparatus 1 may output a voltage higher than 12 V (approximately 48 V, for example) in a state where the energy storage unit 20 is fully charged.

The outer covering 10 includes: the first outer covering 11 forming a lid body of the outer covering 10; and the second outer covering 12 forming a body of the outer covering 10. The first outer covering 11 is a cover member having a flat rectangular shape which closes an opening of the second outer covering 12. A positive electrode external terminal 13 and a negative electrode external terminal 14 are mounted on the first outer covering 11. The energy storage apparatus 1 charges electricity from the outside therein or discharges electricity to the outside through the positive electrode external terminal 13 and the negative electrode external terminal 14. The second outer covering 12 is a bottomed rectangular cylindrical housing having the opening. The second outer covering 12 houses the energy storage unit 20, the holder 30, the bus bars 41, 42, the thermistors 50 and the like.

The first outer covering 11 and the second outer covering 12 may be made of the same material, or may be made of different materials.

Electric equipment such as a printed circuit board and a relay is disposed in the first outer covering 11. However, the illustration of such electric equipment is omitted. The first outer covering 11 is configured to be divided into two members in the vertical direction (Z axis direction), and such electric equipment is disposed between such two members. With such a configuration, the electric equipment is protected from an impact or the like, and is also prevented from coming into contact with a metal member or the like disposed outside the first outer covering 11.

On the printed circuit board, a control circuit is mounted. The control circuit is connected to the energy storage device 100 in the energy storage unit 20 described later through wires, for example, and acquires, monitors and controls various kinds of information such as a charging state and a discharging state, a voltage value, a current value, and a temperature of the energy storage device 100. Further, the control circuit controls ON and OFF of relays and performs communication with other apparatuses. A temperature of the energy storage device 100 means a temperature obtained by using a thermistor 50. That is, the control circuit is connected with the thermistor 50 which is disposed in contact with the energy storage device 100 through a wire (lead line), and a temperature of the energy storage device 100 can be acquired by converting information (resistance value) transmitted from the thermistor 50 into a temperature.

The energy storage unit 20 includes a plurality of energy storage devices 100 (twelve energy storage devices 100 in this embodiment) and a plurality of bus bars 200, and is electrically connected to the positive electrode external terminal 13 and the negative electrode external terminal 14 formed on the first outer covering 11. That is, a positive electrode terminal of any one of the plurality of energy storage devices 100 is electrically connected to the positive electrode external terminal 13 through the bus bar 200. A negative electrode terminal of any one of the plurality of energy storage devices 100 is electrically connected to the negative electrode external terminal 14 through the bus bar 200.

The energy storage unit 20 is disposed in the second outer covering 12 such that the plurality of energy storage devices 100 are arranged in a row in the X axis direction in a state where each energy storage device 100 is mounted vertically (in a state where a positive electrode terminal and a negative electrode terminal are directed upward). The energy storage unit 20 is housed in the outer covering 10 while being covered by the first outer covering 11 from above. The detailed description of the configuration of the energy storage unit 20 and the detailed description of the configuration where the energy storage unit 20 and the outer covering 10 are fixed to each other are made later.

The holder 30 is an electronic component tray. The holder 30 is provided for holding electronic components such as the bus bars 41, 42, and relays, wires (not shown in the drawing). The holder 30 also provides insulation between the bus bars 41, 42 and the like and other members. The holder 30 further regulates the positions of the bus bars 41, 42 and the like. Particularly, the holder 30 positions the bus bars 41, 42 with respect to the bus bars 200 in the energy storage unit 20, the positive electrode external terminal 13, and the negative electrode external terminal 14.

To be more specific, the holder 30 is placed on an upper portion (a plus side in the Z axis direction) of the energy storage unit 20, and is positioned with respect to the energy storage unit 20. The bus bars 41, 42 are placed on the holder 30 and are positioned with respect to the holder 30. The first outer covering 11 is disposed on the holder 30. With such a configuration, the bus bars 41, 42 are positioned with respect to the bus bars 200 in the energy storage unit 20, and the positive electrode external terminal 13 and the negative electrode external terminal 14 mounted on the first outer covering 11.

The holder 30 also has a function of holding the thermistor 50. That is, opening portions are formed in the holder 30. By inserting the thermistors 50 into the opening portions and by rotating the thermistors 50, the thermistors 50 are positioned with respect to the energy storage device 100, and is fixed to the energy storage device 100 in a pressed state.

Although the holder 30 is made of an insulating resin material such as PC, PP, PE, PPS, PBT or an ABS resin, the holder 30 may be made of any material as long as a material has an insulating property.

The bus bars 41, 42 electrically connect the bus bars 200 in the energy storage unit 20 and the positive electrode external terminal 13 and the negative electrode external terminal 14 mounted on the first outer covering 11 to each other. That is, the bus bar 41 is a conductive member which electrically connects the bus bars 200 disposed on one end in the energy storage unit 20 and the positive electrode external terminal 13 to each other, and the bus bar 42 is a conductive member which electrically connects the bus bars 200 disposed on the other end in the energy storage unit 20 and the negative electrode external terminal 14 to each other.

The bus bars 41, 42 are made of copper, for example, as conductive members. However, a material for forming the bus bars 41, 42 is not particularly limited. The bus bars 41, 42 may be made of the same material, or may be made of different materials.

The thermistor 50 is a temperature sensor which is mounted on the energy storage device 100. That is, the thermistor 50 is mounted in a state where the thermistor 50 is pressed to the lid portion of the energy storage device 100. The thermistor 50 measures a temperature of the energy storage device 100. In this embodiment, two thermistors 50 are disposed for two energy storage devices 100.

To be more specific, the thermistors 50 are mounted on the holder 30 after the holder 30 is mounted on the energy storage devices 100. Accordingly, the thermistors 50 are positioned with respect to the energy storage devices 100, and are disposed in a state where the thermistors 50 are pressed to the energy storage devices 100. The principle by which the thermistor 50 measures a temperature of the energy storage device 100 is substantially equal to the principle behind a conventional thermistor and hence, the detailed description of the principle is omitted.

Next, the configuration of the energy storage unit 20 is described in detail.

Figure 3:
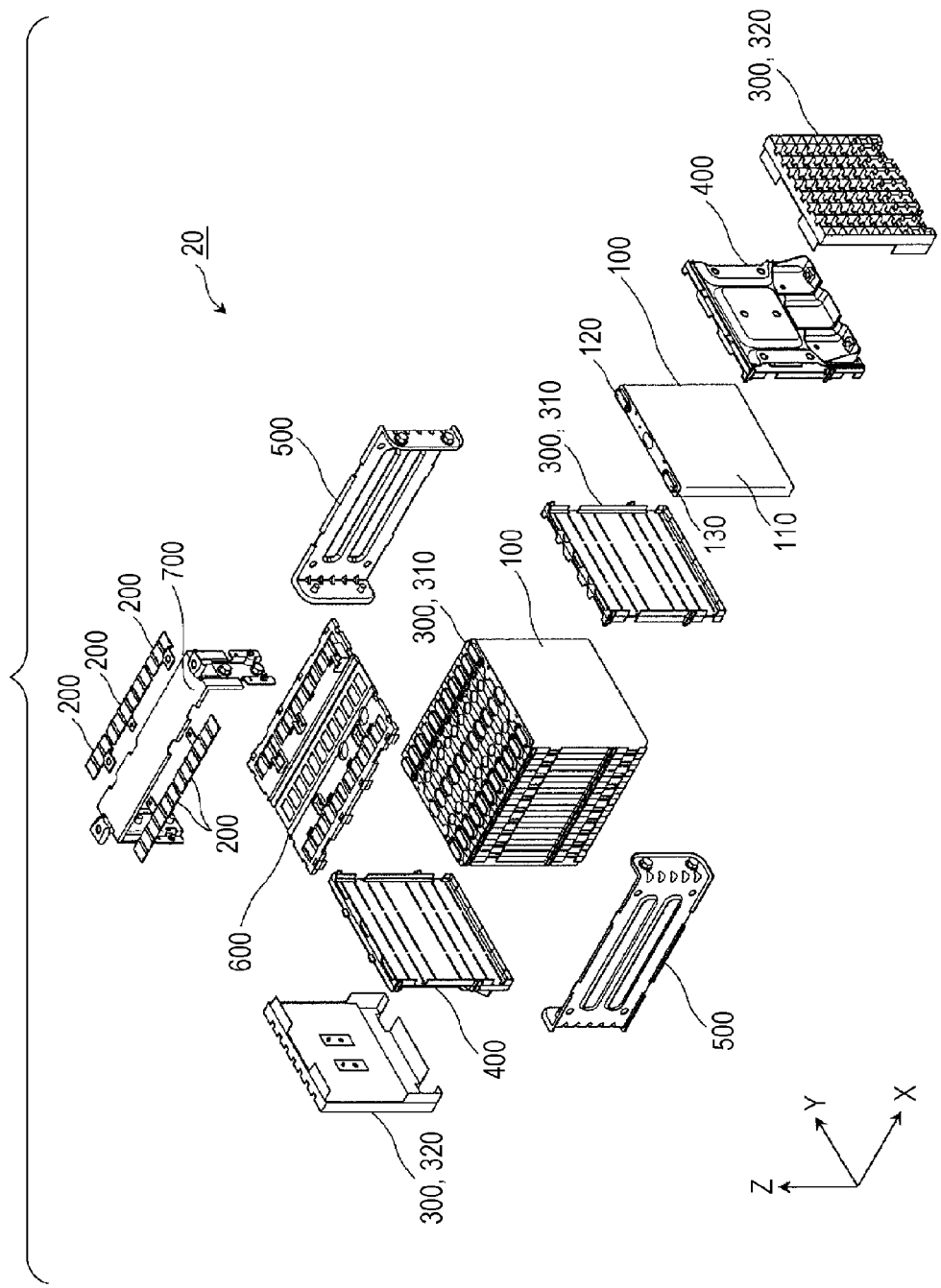
FIG. 3 is an exploded perspective view showing constitutional elements of an energy storage unit.

FIG. 3 is an exploded perspective view showing constitutional elements of the energy storage unit 20.

The energy storage unit 20 includes: the plurality of energy storage devices 100; the plurality of bus bars 200; a plurality of spacers 300 (a plurality of spacers 310 and a pair of spacers 320); a pair of sandwiching members 400; a plurality of binding members 500; a bus bar frame 600; and a heat insulating plate 700.

The energy storage device 100 is a secondary battery (battery) which can charge or discharge electricity. To be more specific, the energy storage device 100 is a nonaqueous electrolyte secondary battery such as a lithium ion secondary battery. The energy storage device 100 has a flat rectangular shape, and is disposed adjacently to the spacer 310. That is, the plurality of energy storage devices 100 and the plurality of respective spacers 310 are arranged in a row in the X axis direction such that the energy storage device 100 and the spacer 310 are alternately arranged. In this embodiment, twelve energy storage devices 100 and eleven spacers 310 are arranged such that the energy storage device 100 and the spacer 310 are alternately arranged. The energy storage device 100 is not limited to a nonaqueous electrolyte secondary battery, and may be a secondary battery other than a nonaqueous electrolyte secondary battery, or may be a capacitor.

As shown in FIG. 3, the energy storage device 100 includes a container 110, the positive electrode terminal 120 and the negative electrode terminal 130. An electrode assembly (power generating element), current collectors (a positive electrode current collector and a negative electrode current collector) and the like are disposed in the container 110, and a liquid such as an electrolyte solution (nonaqueous electrolyte) is sealed in the container 110. However, the detailed description of such a configuration is omitted.

The container 110 is formed of: a bottomed container body made of metal and having a rectangular cylindrical shape; and a metal-made lid portion which closes an opening of the container body. The container 110 is configured such that the inside of the container 110 is hermetically sealed by joining the lid portion and the container body to each other by welding or the like after the electrode assembly and the like are housed in the container 110. The container 110 is a rectangular parallelepiped container having a lid portion disposed on a plus side in the Z axis direction, long side surfaces disposed on side surfaces of the container on both sides in the X axis direction, short side surfaces disposed on side surfaces of the container on both sides in the Y axis direction, and a bottom surface disposed on a minus side in the Z axis direction. Although a material for forming the container 110 is not particularly limited, it is preferable that the container 110 be made of weldable metal such as stainless steel, aluminum or an aluminum alloy.

The positive electrode terminal 120 is an electrode terminal electrically connected to a positive electrode of an electrode assembly through a positive electrode current collector. The negative electrode terminal 130 is an electrode terminal electrically connected to a negative electrode of an electrode assembly through a negative electrode current collector. Both the positive electrode terminal 120 and the negative electrode terminal 130 are mounted on the lid portion of the container 110. That is, the positive electrode terminal 120 and the negative electrode terminal 130 are metal-made electrode terminals through which electricity stored in the electrode assembly is discharged to a space outside the energy storage device 100, and through which electricity is introduced into a space inside the energy storage device 100 for storing the electricity in the electrode assembly. In this embodiment, the energy storage devices 100 are disposed in a state where the positive electrode terminals 120 and the negative electrode terminals 130 are directed upward.

The bus bars 200 are electrically connected to the plurality of respective energy storage devices 100 housed in the energy storage unit 20. That is, the bus bars 200 are conductive members electrically connected to the respective electrode terminals which the plurality of energy storage devices 100 include in a state where either one of positive and negative electrode terminals of one energy storage device 100 is electrically connected to the corresponding terminal of another energy storage device 100 disposed adjacently to one energy storage device. The bus bars 200 are disposed on surfaces of the respective electrode terminals which the plurality of energy storage devices 100 include, and are connected (joined) to the electrode terminals.

In this embodiment, five bus bars 200 are disposed. Twelve energy storage devices 100 are configured such that four sets of energy storage devices 100 each of which is formed by connecting three energy storage devices 100 in parallel to each other are connected in series by five bus bars 200. The bus bars 200 disposed at end portions of the energy storage unit 20 are connected to the above-mentioned bus bars 41, 42 respectively. With such a configuration, the energy storage devices 100 are electrically connected to the positive electrode external terminal 13 and the negative electrode external terminal 14.

The bus bars 200 are made of aluminum, for example, as conductive members. However, a material for forming the bus bar 200 is not particularly limited. All bus bars 200 may be made of the same material, or some of the bus bars 200 may be made of different materials.

The spacers 300 are formed of the plurality of spacers 310 and the pair of spacers 320, and are made of an insulating resin such as PC, PP, PE, PPS, PBT or an ABS resin. The spacers 310 and 320 may be made of any material as long as the spacers have an insulating property. All of spacers 310 and 320 may be made of the same material, or some of the spacers 310 and 320 may be made of different materials respectively.

The spacer 310 is a plate-like member which is disposed on a side of the energy storage device 100 (on the plus side or the minus side in the X axis direction) so as to provide insulation between the energy storage device 100 and other members. That is, the spacer 310 is arranged between two energy storage devices 100 disposed adjacently to each other so as to provide insulation between two energy storage devices 100. In this embodiment, twelve energy storage devices 100 and eleven spacers 310 are arranged in a row such that the spacer 310 is disposed between two energy storage devices 100 disposed adjacently to each other.

The spacer 310 is formed such that the spacer 310 covers an approximately half of a front surface side or a back surface side of the energy storage device 100 (an approximately half of the front surface side or the back surface side when the energy storage device 100 is divided in two in the X axis direction). That is, a recessed portion is formed on both surfaces (both surfaces in the X axis direction) of the spacer 310 on the front surface side and the back surface side respectively, and an approximately half of the energy storage device 100 is inserted into each recessed portion. With such a configuration, the spacers 310 disposed on sides of the energy storage device 100 cover the most part of the energy storage device 100. Accordingly, an insulating property between the energy storage devices 100 and other conductive members can be enhanced by the spacers 310. The spacer 310 is formed such that the spacer 310 does not cover a portion of the energy storage device 100 at which the thermistor 50 is positioned so as to allow the thermistor 50 to be brought into contact with the energy storage device 100.

The spacer 320 is a plate-like member which is disposed between the sandwiching member 400 described later and the outer covering 10, and provides insulation between the sandwiching member 400 and the outer covering 10. The spacer 320 also has a function as a buffer member which protects the energy storage unit 20 when an impact is applied to the outer covering 10 from the outside. The pair of spacers 320 is disposed between the pair of sandwiching members 400 and the outer covering 10 respectively such that the pair of spacers 320 sandwiches the pair of sandwiching members 400 from both sides. The pair of spacers 320 insulates the energy storage devices 100 and the like disposed in the energy storage unit 20 and also protects the energy storage devices 100 and the like from an impact from the outside.

The sandwiching members 400 and the binding members 500 are members which press the energy storage devices 100 from the outside in the stacking direction of the electrode assembly of the energy storage device 100. That is, the sandwiching member 400 and the binding member 500 sandwich the plurality of energy storage devices 100 from both sides in the stacking direction thus pressing the plurality of respective energy storage devices 100 from both sides. In this embodiment, the stacking direction of the electrode assembly of the energy storage devices 100 means the direction that positive electrodes, negative electrodes and separators of the electrode assembly are stacked, and is equal to the direction (X axis direction) that the plurality of energy storage devices 100 are arranged in a row. That is, the plurality of energy storage devices 100 are arranged in a row in the stacking direction.

To be more specific, the sandwiching members 400 are flat plate-like members (end plates) disposed on both sides of a unit formed of the plurality of energy storage devices 100 in the X axis direction. The sandwiching members 400 hold the plurality of energy storage devices 100 and the plurality of spacers 310 by sandwiching the unit formed of the plurality of energy storage devices 100 and the plurality of spacers 310 from both sides in the arrangement direction (X axis direction) of the plurality of energy storage devices 100 and the plurality of spacers 310. The detailed configuration of the sandwiching member 400 is described later.

The binding member 500 is an elongated flat-plate-like member (binding bar) which has both ends thereof mounted on the sandwiching members 400, and binds the plurality of energy storage devices 100 to each other. That is, the binding member 500 is disposed so as to straddle over the plurality of energy storage devices 100 and the plurality of spacers 310 thus applying a binding force in the arrangement direction (X axis direction) of the plurality of energy storage devices 100 and plurality of spacers 310 to the plurality of energy storage devices 100 and plurality of spacers 310.

In this embodiment, two binding members 500 are disposed on both sides (both sides in the Y axis direction) of the unit formed of the plurality of energy storage devices 100, and two binding members 500 bind the plurality of energy storage devices 100 to each other by sandwiching the plurality of energy storage devices 100 from both sides. In the same manner as the sandwiching members 400, the binding members 500 are preferably made of metal such as stainless steel or aluminum. However, the binding members 500 may be made of a material other than metal.

The bus bar frame 600 is a member which can provide insulation between the bus bars 200 and other members, and can regulate the positions of the bus bars 200. Particularly, the bus bar frame 600 performs the positioning of the bus bars 200 with respect to the plurality of energy storage devices 100 disposed in the energy storage unit 20.

To be more specific, the bus bar frame 600 is disposed on an upper side of the plurality of energy storage devices 100 (a plus side in the Z axis direction), and is positioned with respect to the plurality of energy storage devices 100. Although the bus bar frame 600 is made of an insulating resin material such as PC, PP, PE, PPS, PBT or an ABS resin, the bus bar frame 600 may be made of any material as long as the material has an insulating property.

Two thermistor-use opening portions being through holes through which two thermistors 50 are respectively inserted are formed on the bus bar frame 600. Two thermistors 50 are respectively inserted through two thermistor-use opening portions, and are brought into contact with the lid portions of the containers 110 of the energy storage devices 100.

A heat insulating plate 700 is a plate-like member having a heat insulating property. The heat insulating plate 700 is disposed in a flow passage for a gas discharged from safety valves of the energy storage devices 100. The heat insulating plate 700 is disposed above the bus bar frame 600 such that the heat insulating plate 700 is positioned above the safety valves of the energy storage devices 100. When an abnormal state occurs where a gas is discharged from the safety valve of the energy storage device 100, the heat insulating plate 700 protects electric equipment such as a printed circuit board disposed above the energy storage unit 20 from heat of the gas. In this embodiment, the heat insulating plate 700 is made of a metal material having low thermal conductivity such as stainless steel. However, a material for forming the heat insulating plate 700 is not limited to such a metal material, and the heat insulating plate 700 may be made of a resin such as PPS or PBT which is reinforced by glass fibers or ceramics, as long as the material has high heat resistance and low thermal conductivity.

Next, the configuration of the sandwiching member 400 is described in detail. Two sandwiching members 400 have the same configuration. Accordingly, the description is made only on one sandwiching member 400 (the sandwiching member 400 disposed on a plus side in the X axis direction) hereinafter, and the description of the other sandwiching member 400 is omitted.

Figure 4:
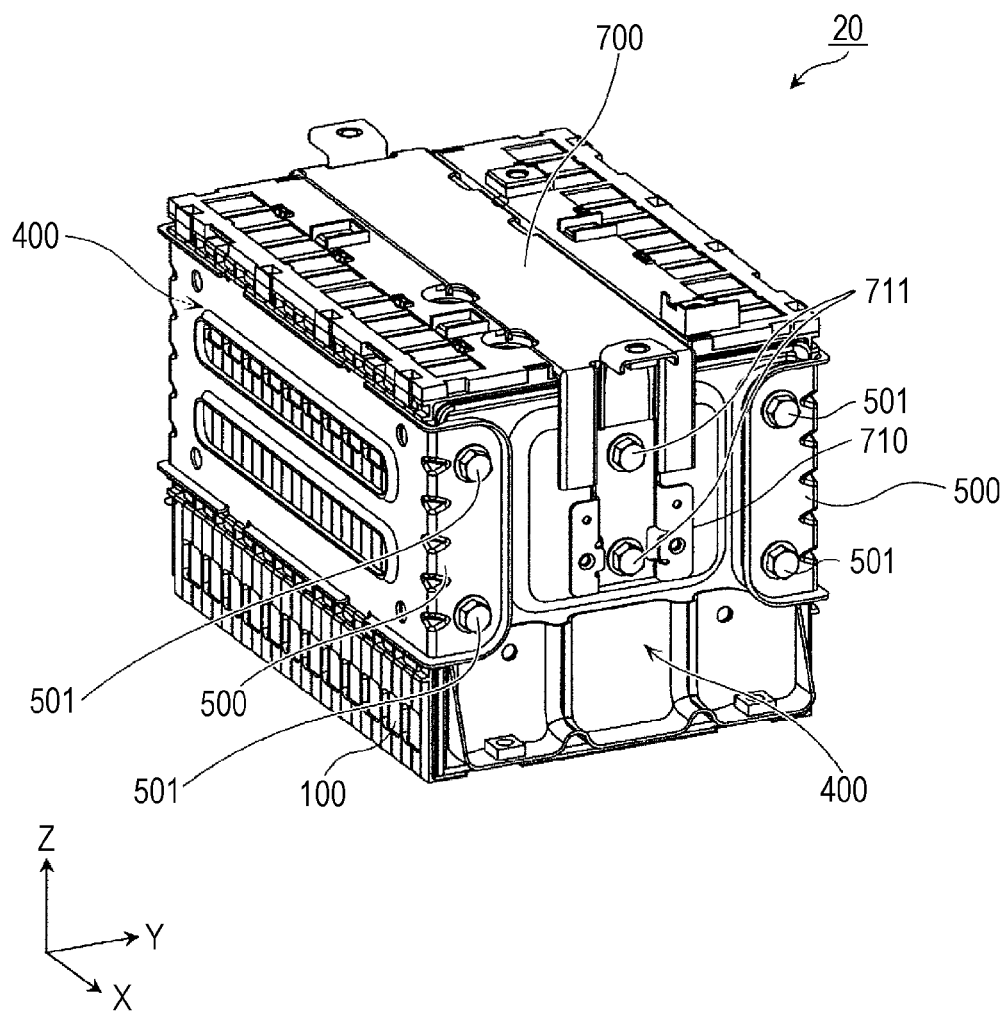
FIG. 4 is a perspective view showing a configuration of the energy storage apparatus where spacers are removed from the energy storage unit.

FIG. 4 is a perspective view showing a configuration where the spacers 300 are removed from the energy storage unit 20 according to the embodiment of the present invention.

As shown in FIG. 4, a pair of binding members 500 and the heat insulating plate 700 are mounted on the sandwiching members 400. To be more specific, both end portions of each sandwiching member 400 in the Y axis direction are respectively mounted on end portions of the binding members 500 in a longitudinal direction (in this embodiment, end portions in the X axis direction) by screws 501, and a center portion of each sandwiching members 400 in the Y axis direction is mounted on each end portion of the heat insulating plate 700 in a longitudinal direction (in this embodiment, each end portion in the X axis direction) by screws 711.

The sandwiching member 400 is configured such that a plate-like resin-made member which is disposed on an energy storage device 100 side (a minus side in the X axis direction) and a plate-like metal-made member which is disposed on a side opposite to the energy storage device 100 (a plus side in the X axis direction) are made to overlap with each other. This configuration is described with reference to FIG. 5.

Figure 5:
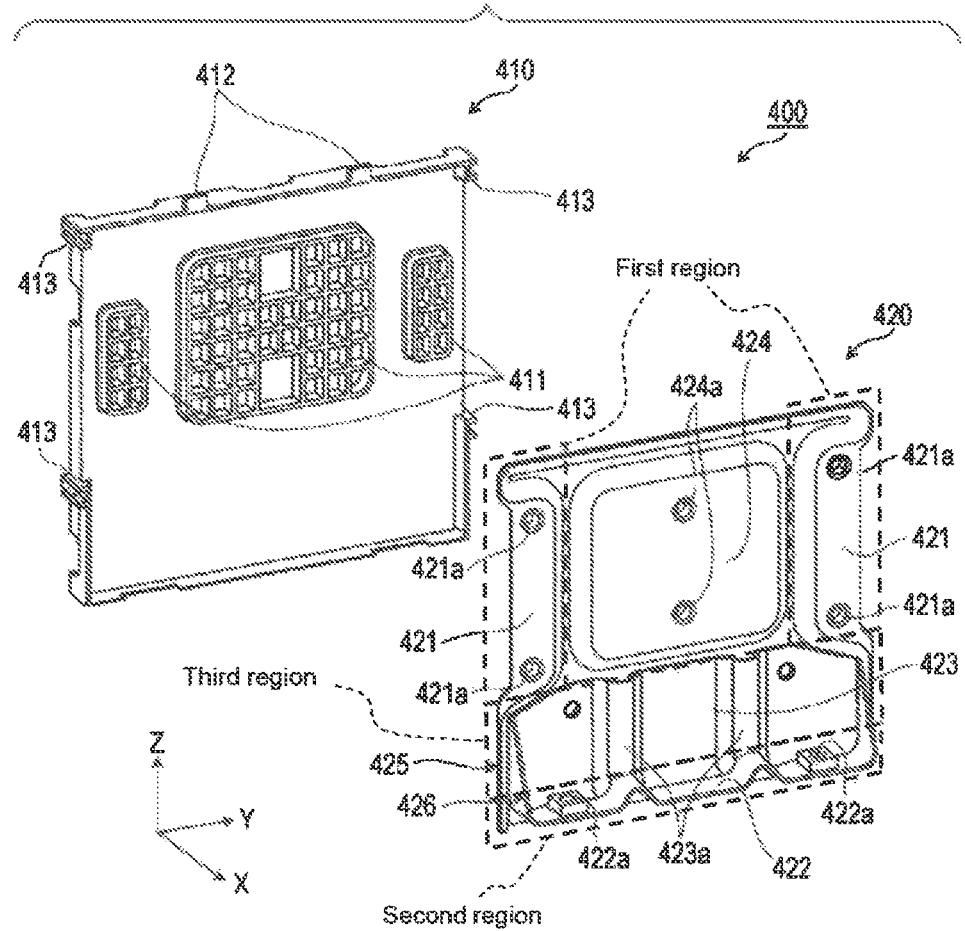
FIG. 5 is an exploded perspective view showing constitutional elements of a sandwiching member.

FIG. 5 is an exploded perspective view showing constitutional elements of the sandwiching member 400.

As shown in FIG. 5, the sandwiching member 400 includes a resin end plate 410 and a metal end plate 420 which are disposed adjacently to the energy storage device 100 in this order.

The resin end plate 410 is disposed between the energy storage device 100 disposed at an end portion among the plurality of energy storage devices 100 in the energy storage unit 20 and the metal end plate 420 so as to provide insulation between the energy storage device 100 and the metal end plate 420. Although the resin end plate 410 is made of an insulating resin such as PC, PP, PE, PPS, PBT or an ABS resin, the resin end plate 410 may be made of any material as long as the material has an insulating property.

To be more specific, the resin end plate 410 is formed such that the resin end plate 410 covers an approximately half on a front surface side (a plus side in the X axis direction) of the energy storage device 100 disposed on an end portion on a plus side in the X axis direction. That is, a recessed portion is formed on a back surface side (a minus side in the X axis direction) of the resin end plate 410, and an approximately half of the above-mentioned energy storage device 100 is inserted into the recessed portion. With such a configuration, the spacer 310 and the resin end plate 410 which sandwich the above-mentioned energy storage device 100 therebetween cover the most part of the energy storage device 100. Accordingly, an insulating property between the energy storage device 100 and other conductive members can be enhanced by the spacer 310 and the resin end plate 410.

The resin end plate 410 is formed such that the resin end plate 410 covers a back surface side (a minus side in the X axis direction) of the metal end plate 420. That is, a recessed portion is formed on a front surface side of the resin end plate 410, and the back surface side of the metal end plate 420 is inserted into the recessed portion. With such a configuration, an insulating property between the energy storage device 100 and the metal end plate 420 can be enhanced by the resin end plate 410.

In this embodiment, projecting portions 411 which project toward the metal end plate 420 are formed on the resin end plate 410. The projecting portions 411 are disposed in recessed portions which are formed on the back surface of the metal end plate 420 due to bulging of portions of the metal end plate 420 toward the outside of the outer covering 10, and end portions of the projecting portions in a projecting direction are brought into contact with bottom surfaces of the recessed portions. With such a configuration, even when a portion of the metal end plate 420 is formed in a bulging manner, a binding force generated by the binding members 500 can be efficiently applied to the energy storage devices 100.

The projecting portion 411 is formed of a grid-like continuous wall, for example. The shape of the projecting portion 411 is not limited to such a shape, and the projecting portion 411 may have a columnar shape, for example. The projecting portion 411 may be a portion of the resin end plate 410 which has a large wall thickness. Further, the resin end plate 410 may not have the projecting portion 411, but have a flat plate shape.

Two protruding portions 412 which project upward are formed on an upper end portion (an end portion on a plus side in the Z axis direction) of the resin end plate 410. The resin end plate 410 positions the bus bar frame 600 with respect to the plurality of energy storage devices 100 by two protruding portions 412, for example. Further, two protruding portions 413 which project outward are formed on both end portions of the resin end plate 410 in the Y axis direction respectively. The resin end plate 410 positions the binding members 500 with respect to the plurality of energy storage devices 100 and the sandwiching member 400 by two protruding portions 413 disposed on both end portions of the resin end plate 410 in the Y axis direction respectively, for example. The resin end plate 410 may not be provided with the protruding portions 412, 413.

The metal end plate 420 is disposed on a front surface side of the resin end plate 410 having the above-mentioned configuration.

The metal end plates 420 are flat plate-like members which sandwich and hold the plurality of energy storage devices 100, the plurality of spacers 310, and the resin end plates 410 from both sides in the arrangement direction of these components (X axis direction). The metal end plate 420 has binding portions 421 on which the binding members 500 are respectively mounted, a fixing portion 422 which is fixed to the outer covering 10, a high rigidity portion 423, and a heat insulating plate mounting portion 424 on which the heat insulating plate 700 is mounted.

The metal end plate 420 includes a plurality of members which are made to overlap with each other. Such a configuration is described also with reference to FIGS. 6A-6B.

Figure 6A:
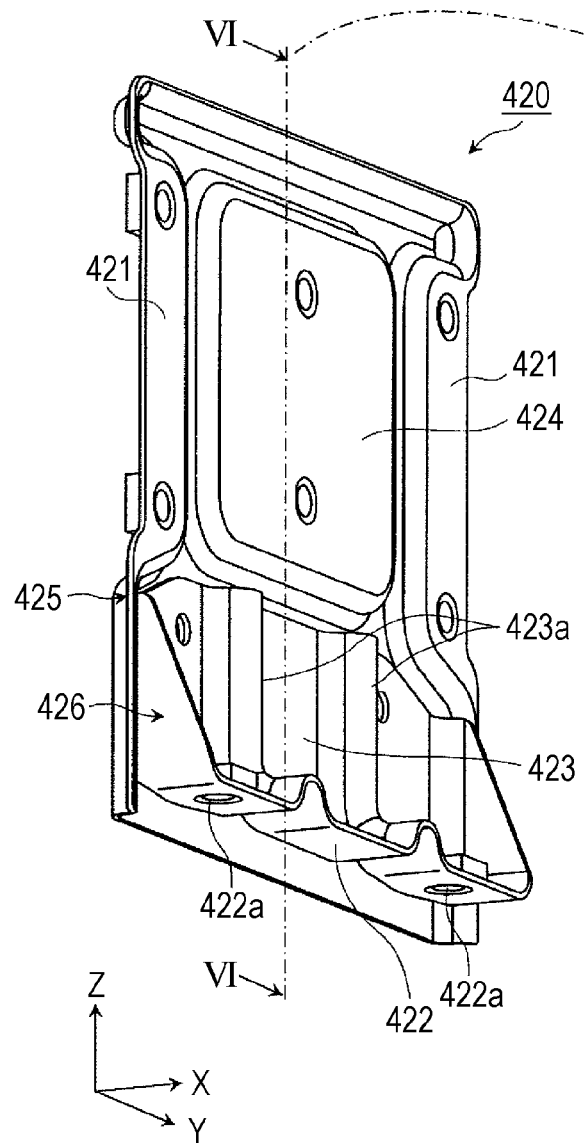
FIGS. 6A-6B is a view showing a detailed configuration of a metal end plate.
Figure 6B:
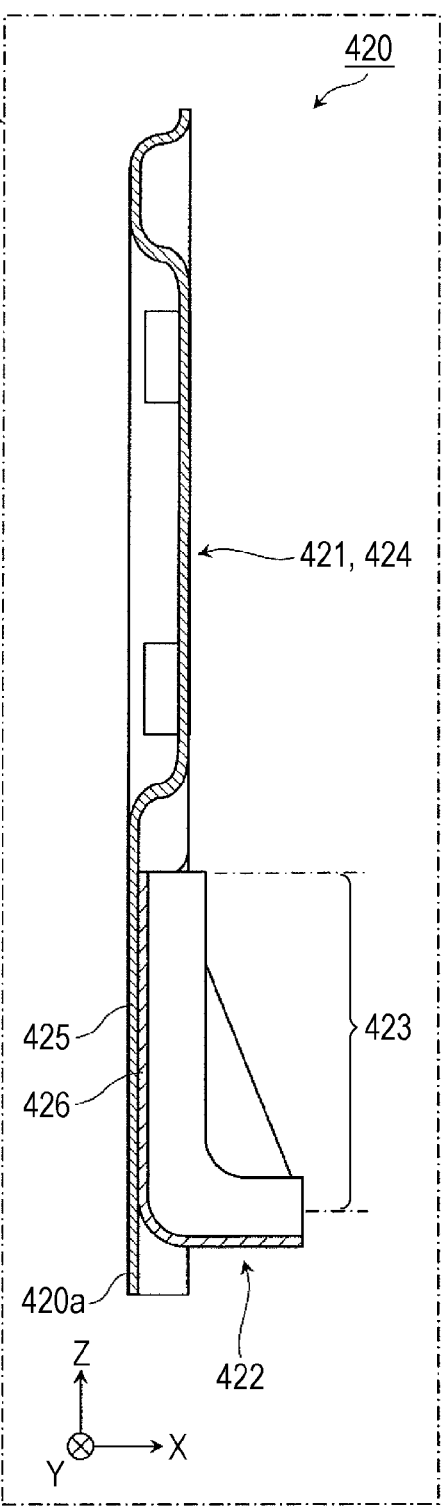

FIGS. 6A-6B is a view showing the detailed configuration of the metal end plate 420. FIG. 6A is a perspective view of the metal end plate 420, and FIG. 6B is a cross-sectional view of the metal end plate 420 taken along a line VI-VI in FIG. 6A which is a perspective view.

As shown in FIG. 5 and FIGS. 6A-6B, the metal end plate 420 includes a plate member 425 and a plate member 426 which are disposed in this order from an energy storage device 100 side. The binding portion 421 and the heat insulating plate mounting portion 424 are formed of the plate member 425. The high rigidity portion 423 is formed of the plate member 425 and the plate member 426. The fixing portion 422 is formed of the plate member 426.

Hereinafter, the detailed configuration of the metal end plate 420 is described.

First, the plate members 425, 426 which form the metal end plate 420 are described in detail.

The plate member 425 is a metal-made plate-like member having an approximately rectangular shape which is disposed in the recessed portion formed on a front surface side of the resin end plate 410 and has an outer profile slightly smaller than a profile of the recessed portion. The plate member 425 forms the binding portions 421 and the heat insulating plate mounting portion 424. The plate member 425 also forms the high rigidity portion 423 together with the plate member 426.

The plate member 426 is a metal-made plate-like member having a strip shape which is disposed on the front surface side of the plate member 425 in an overlapping manner. With such an outer profile, the plate member 426 has a smaller width (a size in the Z axis direction) than the plate member 425. The plate member 426 is disposed at a position different from a position where the binding portions 421 and the heat insulating plate mounting portion 424 are disposed, and is integrally formed (integrated) with the plate member 425 by spot welding or the like. That is, the plate member 426 and the plate member 425 are made to overlap with each other in a state where the plate member 425 and the plate member 426 are difficult to be separated from each other. To be more specific, the plate member 426 is disposed such that an upper portion (a portion on a plus side in the Z axis direction, an overlapping portion) of the plate member 426 is made to overlap with the plate member 425. That is, the upper portion of the plate member 426 is formed integrally with the plate member 425 thus forming the high rigidity portion 423. A lower portion (a portion on a minus side in the Z axis direction, a flange portion) of the plate member 426 is bent toward the outside of the outer covering 10, and forms the fixing portion 422.

From a viewpoint of strength, easiness in forming and the like, for example, the plate members 425, 426 are weldable metal-made members formed using a steel plate for general structure, a plated steel plate, a high tensile steel plate obtained by enhancing strength of the steel plate or the plated steel plate, stainless steel, aluminum or an aluminum alloy. The material for forming the plate members 425, 426 is not limited to such materials, and the plate members 425, 426 may be made of metal other than metals described above, a resin having high strength or the like, for example.

Next, the detailed configurations of respective portions of the metal end plate 420 (binding portions 421, fixing portion 422, high rigidity portion 423 and heat insulating plate mounting portion 424) are described with reference to FIG. 4 to FIGS. 6A-6B.

As shown in these drawings, the binding portions 421 are portions of the sandwiching member 400 on which the binding members 500 are mounted, and are disposed in a first region. In this embodiment, the binding portion 421 is formed on both end portions of the metal end plate 420 in the Y axis direction respectively. In each binding portion 421, through holes 421a into which screws 501 for mounting the binding member 500 on the metal end plate 420 are inserted are formed. It is sufficient that the through holes 421a are formed so as to correspond to through holes (not shown in the drawing) formed in the binding member 500 into which the screws 501 are inserted. Although the number of through holes 421a is not particularly limited, in this embodiment, two through holes 421a are formed in each binding portion 421.

The binding portions 421 are formed in a bulging manner toward the outside of the outer covering 10 by press working or the like. The binding portions 421 are ribs projecting toward the outside of the outer covering 10. Two through holes 421a are formed in a distal end of the rib.

The fixing portion 422 is a portion of the sandwiching member 400 to be fixed to the outer covering 10, and is disposed in a second region. In this embodiment, the fixing portion 422 is disposed slightly inside (above) the lower end portion 420a (an end portion on a minus side in the Z axis direction) of the metal end plate 420. In the fixing portion 422, through holes 422a into which fastening jigs for fixing the metal end plate 420 to the outer covering 10 are inserted are formed. It is sufficient that the through holes 422a are formed so as to correspond to through holes (not shown in the drawing) formed in the outer covering 10 into which the fastening jigs are inserted. Although the number of through holes 422a is not particularly limited, in this embodiment, two through holes 422a are formed in the fixing portion 422. The configuration where the fixing portion 422 and the outer covering 10 are fixed to each other is described later along with the configuration where the energy storage unit 20 and the outer covering 10 are fixed to each other.

The fixing portion 422 projects toward the outside of the outer covering 10 from the other portion of the metal end plate 420. To be more specific, the fixing portion 422 projects toward the outside (a plus side in the X axis direction) of the outer covering 10 along the arrangement direction (X axis direction) of the energy storage devices 100. With such a configuration, the outer covering 10 is fixed to the fixing portion 422 in a state where the outer covering 10 houses the energy storage unit 20 therein and, at the same time, the outer covering 10 can apply a binding force to the energy storage devices 100 in the arrangement direction of the energy storage devices 100.

The high rigidity portion 423 is a portion which is different from the binding portions 421 and the fixing portion 422 and has higher rigidity than the binding portions 421 and the fixing portion 422. The high rigidity portion 423 is disposed in a third region. The rigidity of the binding portions 421, the fixing portion 422 and the high rigidity portion 423 can be evaluated, for example, by forming a shape of the metal end plate 420 as a 3D model using a Computer Aided Design (CAD) or by reading a shape of the metal end plate 420 from the actual metal end plate 420 by 3D scanning and, thereafter, by performing a Computer Aided Engineering (CAE) analysis or the like.

In this embodiment, the high rigidity portion 423 is disposed in an intermediate region between the binding portions 421 and the fixing portion 422. To be more specific, the high rigidity portion 423 is disposed in a substantially whole area between the binding portions 421 and the fixing portion 422 as well as between the heat insulating plate mounting portion 424 and the fixing portion 422. The high rigidity portion 423 is provided over an entire width (entire width in the Y axis direction) of the metal end plate 420 between the binding portions 421 and the fixing portion 422.

An arrangement position and a size of the high rigidity portion 423 are not particularly limited, and the high rigidity portion 423 may not be disposed in the above-mentioned intermediate region, and may be disposed in a region outside a region where the binding portions 421 and the fixing portion 422 are embraced. The high rigidity portion 423 may not be always formed over the entire width of the metal end plate 420, and may be formed only over a partial width of the metal end plate 420.

From a viewpoint of suppressing the deformation of the sandwiching member 400, it is preferable that the high rigidity portion 423 be disposed in the above-mentioned intermediate region. Further, it is preferable that the high rigidity portion 423 extend over the binding portions 421 and the fixing portion 422. From the same viewpoint, it is preferable that the high rigidity portion 423 be formed over the entire width of the sandwiching member 400. It is preferable that the high rigidity portion 423 be formed over the entire width of the energy storage device 100 or the entire width of the electrode assembly (not shown in the drawing) in the energy storage device 100 when the sandwiching member 400 and the energy storage device 100 are viewed in the arrangement direction of the sandwiching members 400 and the energy storage devices 100.

In this embodiment, the high rigidity portion 423 is formed of a plurality of plate members (in this embodiment, two plate members 425, 426) which are made to overlap with each other. To be more specific, the high rigidity portion 423 is formed of the plate member 425 and the plate member 426 which are formed into an integral body by spot welding or the like. Accordingly, the high rigidity portion 423 has higher rigidity than the binding portions 421 and the heat insulating plate mounting portion 424 which are respectively formed of only the plate member 425. In the same manner, the high rigidity portion 423 has higher rigidity than the fixing portion 422 which is formed of only the plate member 426.

A strip-like projecting portions 423a are formed on the high rigidity portion 423. In this embodiment, two projecting portions 423a are formed on the high rigidity portion 423 by forming portions of the plate member 426 in a projecting shape toward the outside of the outer covering 10 by press working.

The projecting portions 423a are formed in an extending manner from the binding portions 421 to the fixing portion 422 respectively. To be more specific, the projecting portions 423a are formed in an extending manner from the binding portions 421 and the heat insulating plate mounting portion 424 to the fixing portion 422. For example, each projecting portion 423a extends over the entire width of the high rigidity portion 423 along the Z axis direction, and in this embodiment, each projecting portion 423a extends over the entire width of the plate member 425.

The number of projecting portions 423a is not particularly limited, and may be one or three or more. Also the projecting direction and the extending direction of the projecting portion 423a are not particularly limited. The projecting portion 423a may be formed in a projecting manner toward the outside of the outer covering 10, or may be formed in an extending manner in a direction other than the Z axis direction.

The heat insulating plate mounting portion 424 is a portion on which the bent portion formed on the end portion of the heat insulating plate 700 in the X axis direction is mounted. Two through holes 424a through which screws 701 for fixing the bent portion to the metal end plate 420 are inserted are formed in the heat insulating plate mounting portion 424. That is, the heat insulating plate 700 is disposed so as to straddle over the plurality of energy storage devices 100 in the energy storage unit 20, and both ends of the heat insulating plate 700 in the arrangement direction of the plurality of energy storage devices 100 are fixed to the sandwiching members 400. With such a configuration, when an abnormal state occurs, the heat insulating plate mounting portion 424 can protect electric equipment such as a printed circuit board disposed above the energy storage unit 20 from heat of a gas. At the same time, the heat insulating plate mounting portion 424 can apply a binding force to the energy storage devices 100 in the arrangement direction of the energy storage devices 100.

In this embodiment, the heat insulating plate mounting portion 424 is disposed between two binding portions 421. The heat insulating plate mounting portion 424 is formed in a bulging manner toward the outside of the outer covering 10 by press working or the like. The heat insulating plate mounting portion 424 is a rib which projects toward the outside of the outer covering 10. Two through holes 424a are formed in a distal end of the rib.

Next, a configuration where the sandwiching members 400 and the outer covering 10 are fixed to each other (that is, a configuration where the energy storage unit 20 and the outer covering 10 are fixed to each other) is described in detail.

Figure 7:
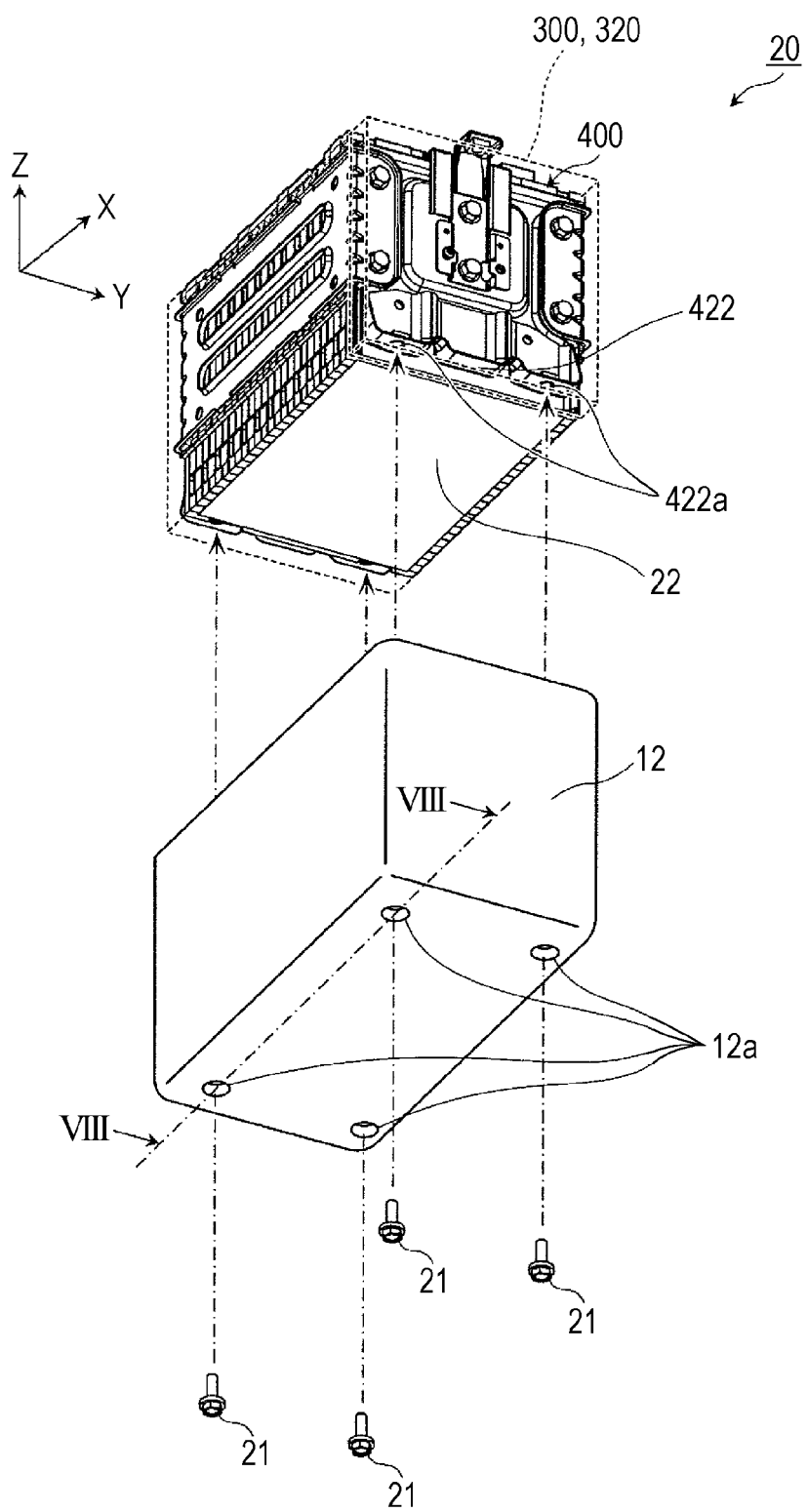
FIG. 7 is a perspective view showing a mode where the energy storage unit and an outer covering are fixed to each other.

FIG. 7 is a perspective view showing a mode where the energy storage unit 20 and the outer covering 10 (second outer covering 12) are fixed to each other. FIG. 7 shows the configuration of the energy storage unit 20 although the illustration of the spacers 320 is omitted.

By fixing the sandwiching members 400 and the outer covering 10 (in this embodiment, second outer covering 12) to each other, the energy storage unit 20 is fixed to the outer covering 10 in a state where the energy storage unit 20 is housed in the outer covering 10.

The outer covering 10 (second outer covering 12) has mounting portions 12a which are provided for the fastening jigs 21. The mounting portions 12a are formed of recessed portions each of which is recessed toward the sandwiching member 400. The fixing portions 422 of the sandwiching members 400 are fixed to the mounting portions 12a by the fastening jigs 21. With such a configuration, the energy storage unit 20 is fixed to the second outer covering 12 in a state where the energy storage unit 20 is housed in the second outer covering 12.

A through hole (not shown in the drawing) into which the fastening jig 21 is inserted is formed in each mounting portion 12a. The mounting portion 12a forms a fastening portion where the outer covering 10 and the sandwiching member 400 are fastened to each other.

The fastening jigs 21 are, for example, bolts which fix the sandwiching member 400 to the outer covering 10 (in this embodiment, the second outer covering 12). The mounting portions 12a and the fixing portions 422 are fastened to each other by inserting the fastening jigs 21 into the through holes formed in the mounting portions 12a and the through holes 422a formed in the fixing portions 422. The fastening jig 21 is not limited to a bolt. For example, the fixing portion 422 may be formed of a male screw, and the fastening jig 21 may be formed of a nut.

Due to such fixing (fastening) by the fastening jigs 21, the energy storage unit 20 is fixed to the outer covering 10. As shown in FIG. 7, the energy storage unit 20 is fixed to the outer covering 10 also by an adhesive element 22 disposed between the energy storage devices 100 and the outer covering 10. The adhesive element 22 fixes the energy storage devices 100 in the energy storage unit 20 to the outer covering 10 at a position different from positions where the fastening jigs 21 fix the energy storage devices 100 to the outer covering 10. The adhesive element 22 is, for example, a double-coated adhesive tape. The adhesive element 22 is not limited to such a double-coated adhesive tape, and may be an adhesive agent. Alternatively, the adhesive element 22 may be an adhesive element having a hook and loop fastener which allows the adhesion in a detachable manner and is referred to as Magic Tape (registered trademark) or Velcro tape (registered trademark).

The configuration of the energy storage unit 20 housed in the outer covering 10 as described above is described in detail hereinafter.

Figure 8:
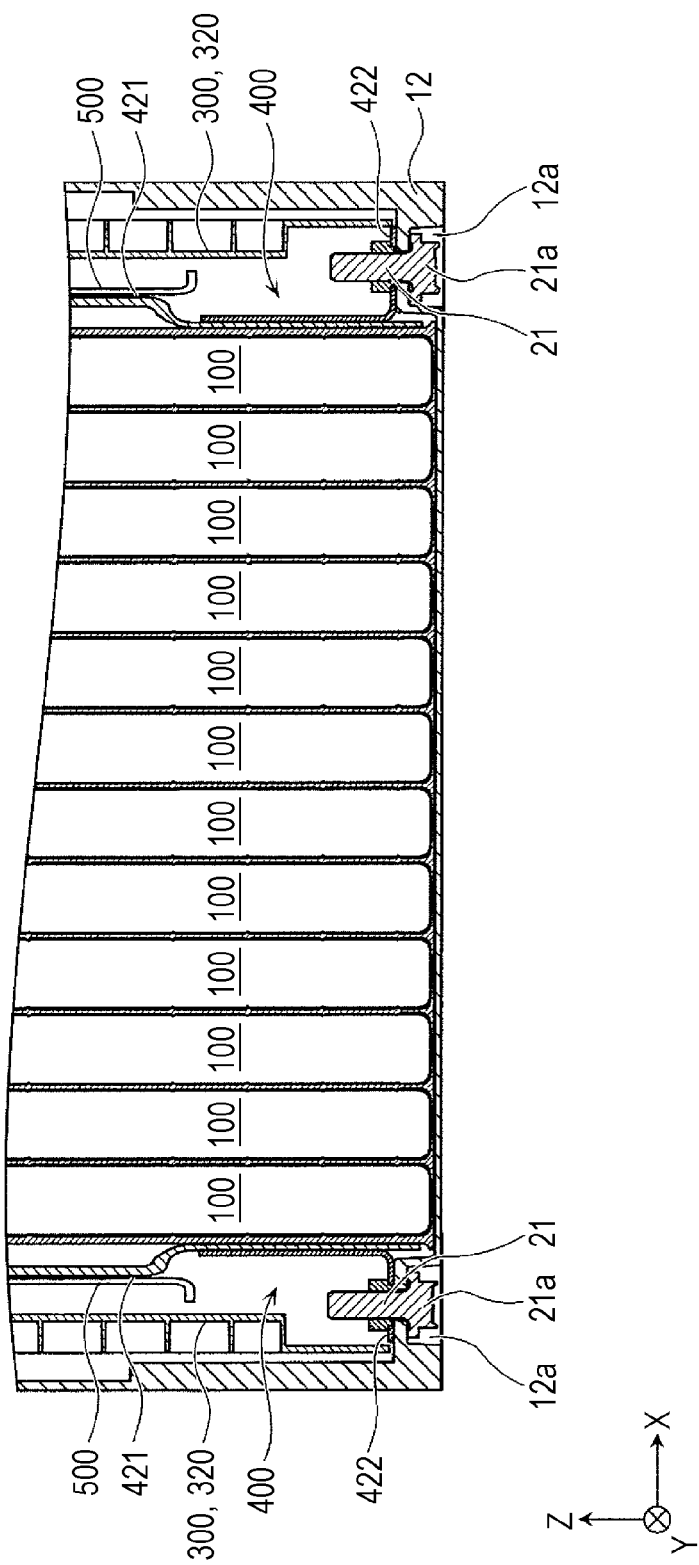
FIG. 8 is a cross-sectional view showing a state where the energy storage unit is housed in the outer covering.

FIG. 8 is a cross-sectional view showing a state where the energy storage unit 20 is housed in the outer covering 10 (second outer covering 12). To be more specific, FIG. 8 is a cross-sectional view taken along a line VIII-VIII in the perspective view of FIG. 7 in a state where the energy storage unit 20 is housed in the outer covering 10. In these drawings, among constitutional elements which form the energy storage apparatus 1, the second outer covering 12 and the energy storage unit 20 are described and the illustration of other constitutional elements is omitted.

As shown in these drawings, the fixing portions 422 (second regions) are disposed at positions corresponding to the mounting portions 12a (recessed portions of the outer covering 10) and are fixed to the mounting portions 12a. The fixing portions 422 are disposed at a position inside the outer covering 10 by an amount corresponding to a depth of the mounting portion 12a (a depth of the recessed portion) compared to a case where the mounting portions 12a are assumed to be formed without indentation. With such a configuration, a head portion 21a (an end portion on the outer side of the outer covering 10) of the fastening jig 21 is disposed in the mounting portion 12a and hence, it is possible to suppress the projection of the fastening jigs 21 to the outside of the outer covering 10.

As described above, the fixing portion 422 is disposed slightly inside the lower end portion 420a (see FIGS. 6A-6B) of the metal end plate 420. Accordingly, an end edge (the end edge on the minus side in the Z axis direction) of the lower end portion 420a is disposed at a position relatively close to an inner wall of the outer covering 10. Accordingly, as shown in FIG. 8, the plurality of energy storage devices 100 can be disposed at a position relatively close to the inner wall. With such a configuration, while a large arrangement space for arranging the energy storage devices 100 is ensured in the outer covering 10, it is possible to suppress the projection of the fastening jigs 21 to the outside of the outer covering 10.

As has been described above, according to the energy storage apparatus 1 of this embodiment, since the binding member 500 is mounted in the first region (in this embodiment, the binding portion 421), the deformation of the first region is suppressed by the binding member 500. Since the second region (in this embodiment, the fixing portion 422) is fixed to the outer covering 10, the deformation of the second region is suppressed by the outer covering 10. That is, both the deformation of the first region and the second region are suppressed by the other members which are connected to the end plate (in this embodiment, the sandwiching member 400). The third region (in this embodiment, the high rigidity portion 423) which differs from the first region and the second region has higher rigidity than the first region and the second region and hence, the deformation of the third region is suppressed by the rigidity of the sandwiching member 400 per se without relying on other members. As described above, since all of the deformation of the first region, the second region and the third region are suppressed, the deformation of the end plate can be suppressed.

According to this embodiment, the third region is formed of the plurality of plate members (in this embodiment, two plate members 425, 426) which are made to overlap with each other and hence, the rigidity of the third region can be increased with the simple configuration.

According to this embodiment, the strip-like projecting portions 423a are formed on the third region and hence, the rigidity of the third region can be increased while the increase of a material and a weight of the sandwiching member 400 are suppressed.

According to this embodiment, the projecting portions 423a are formed in an extending manner from the first region to the second region and hence, the rigidity of the third region can be further increased.

According to this embodiment, the second region is disposed at a position corresponding to the recessed portions (in this embodiment, the mounting portions 12a) of the outer covering 10 and hence, the second region is positioned more inside the outer covering 10 compared to a case where the outer covering 10 has no such recessed portions. Accordingly, in the case where the third region is positioned between the first region and the second region, a size of the third region can be made small. As a result, the deformation which occurs on the third region when a stress is applied to the third region can be further suppressed.

In this embodiment, the outer covering 10 is formed of a box-shaped container. However, a shape of the outer covering 10 is not limited to such a shape. For example, the outer covering may have a cylindrical shape where a wall which forms a part of a plurality of walls for forming the box-shaped container is cut away. For example, the outer covering may be formed of: a pair of walls which face each other with the energy storage devices 100 interposed therebetween; and columnar members or beam members which extend between and over the pair of walls.

For example, the outer covering may be formed of a plate-like base plate on which the plurality of energy storage devices 100 are placed and fixed. That is, the energy storage apparatus is not limited to the configuration where the energy storage devices 100 are fixed to the outer covering by fixing the end plates to the outer covering, and may be configured such that the energy storage devices 100 per se are fixed to the outer covering. That is, the end plate may not have the second region to be fixed to the outer covering.

In this embodiment, although the outer covering 10 is provided as a body separate from the binding members 500, the outer covering may be integrally formed with the binding members. That is, some walls out of a plurality of walls which form the outer covering may function as the sandwiching members 400 in the above-mentioned embodiment, and other walls out of the plurality of walls may function as the binding members 500 in the above-mentioned embodiment. Hereinafter, as a modification of the embodiment of the present invention, an energy storage apparatus having such configurations is described.

(Modification)

FIG. 9 is an exploded perspective view showing respective constitutional elements when an energy storage apparatus 1A according to a modification of the embodiment of the present invention is disassembled. In the drawing, hatching is applied to a high rigidity portion 123, and an outer covering 10A and energy storage devices 100 are described and the illustration of other constitutional elements is omitted.

The outer covering 10A shown in FIG. 9 includes: a first outer covering 11A which forms a lid body of the outer covering 10A; and a second outer covering 12A which forms a body of the outer covering 10A. To be more specific, the first outer covering 11A has an upper wall 111f of the outer covering 10A, and the second outer covering 12A has side walls 111a to 111d of the outer covering 10A, and a bottom wall 111e of the outer covering 10A.

In the energy storage apparatus 1A having such a configuration, the side walls 111a, 111c function as end plates disposed on the sides of a unit of the energy storage devices 100, and the side walls 111b, 111d function as binding members which apply a binding force to the energy storage devices 100.

Hereinafter, the configurations of the side walls 111a, 111c are described in detail. The side wall 111a and the side wall 111c have the same configuration and hence, hereinafter, the configuration of the side wall 111c is described and the description on the configuration of the side wall 111a is omitted.

The side wall 111c (end plate) has binding portions 121 and the high rigidity portion 123. The binding portions 121 are portions on which the side walls 111b, 111d (binding members) are mounted, and are disposed in a first region. The high rigidity portion 123 is a portion different from the binding portions 121, has higher rigidity than the binding portions 121, and is disposed in a third region. The high rigidity portion 123 is, for example, formed of a plurality of plate members which are made to overlap with each other.

The energy storage apparatus 1A according to this modification having the above-mentioned configuration can also acquire substantially the same advantageous effects as the energy storage apparatus 1 according to the above-mentioned embodiment. That is, the deformation of the end plates (in this modification, the side walls 111a, 111c) can be suppressed. To be more specific, since the first regions (in this modification, the binding portions 121) are mounted on the binding members (in this modification, the side walls 111b, 111d), the deformation of the first regions is suppressed by the binding members. Further, since the third region (in this modification, the high rigidity portion 123) which differs from the first regions has higher rigidity than the first regions, the deformation of the third region is suppressed by the rigidity of the end plate per se without relying on other members. In this manner, since both the deformation of the first regions and the third region are suppressed, in the same manner as the above-mentioned embodiment, the deformation of the end plates can be suppressed.

Particularly, in this modification, the third region is disposed between two first regions. Accordingly, the deformation of the third region can be further suppressed.

(Other Modifications)

Although the energy storage apparatuses according to the embodiment of the present invention and the modifications of the embodiment have been described heretofore, the present invention is not limited to the above-mentioned embodiment and the modifications of the embodiment. That is, it should be construed that the embodiment and the modifications of the embodiment disclosed in this specification are only for an exemplifying purpose in all aspects and are not limited. The scope of the present invention is not designated by the above-mentioned description but is designated by Claims, and it is intended that all modifications which fall within the meaning and the scope equivalent to Claims are also included in the scope of the present invention. Further, the configurations which are made by arbitrarily combining the respective constitutional elements which the above-mentioned embodiment and the modifications of the embodiment include are also included in the scope of the present invention.

For example, in the above-mentioned embodiment, the energy storage apparatus includes the pair of sandwiching members 400. However, the number of sandwiching members 400 is not particularly limited, and may be one or three or more, for example. When the number of sandwiching member is one, the sandwiching member 400 may sandwich the energy storage devices 100 together with the inner wall of the outer covering 10 which faces the sandwiching member 400 with the energy storage devices 100 interposed therebetween.

In the above-mentioned embodiment, the third region (in the description made heretofore, the high rigidity portion 423) is formed of two plate members (in the description made heretofore, two plate members 425, 426) which are made to overlap with each other. However, the number of plate members may be three or more. For example, the third region may be formed of the same plate member as the first region, and may be formed with a wall thickness larger than that of the first region. That is, the metal end plate 420 may not be always formed of a plurality of plate members which are made to overlap with each other, and may be formed of one plate member.

In the above-mentioned embodiment, the strip-like projecting portions 423a are formed in the third region. However, the third region may not have the projecting portions 423a, but have a flat plate shape. It is preferable that the projecting portion 423a be formed into a strip shape from a viewpoint of effectively enhancing rigidity of the third region. However, the projecting portion 423a may be formed in a shape where the projecting portion 423a becomes shorter than the case where the projecting portion 423a is formed in a strip shape and the projecting portion 423a is formed locally.

In the above-mentioned embodiment, the outer covering 10 includes the mounting portions 12a each of which is formed of the recessed portion which is recessed toward the end plate. However, the mounting portions 12a may be formed without indentation. For example, the mounting portions 12a may be formed coplanar with an outer surface of the bottom wall of the second outer covering 12. Further, in the above-mentioned embodiment, although the recessed portions are formed on the bottom wall of the second outer covering 12, the position where the recessed portions are formed is not limited to such a position. For example, the recessed portions may be formed on the side wall of the second outer covering 12 or may be formed on the first outer covering 11.

In the above-mentioned embodiment, the end plate is formed such that the plate-like member (the resin end plate 410) made of a resin and the plate-like member (the metal end plate 420) made of metal are made to overlap with each other. However, the end plate is not limited to such a configuration. The end plate may be formed of one plate-like member made of a resin or metal, or may be formed of a plate-like member made of other material. Further, the end plate may be formed by arbitrarily combining these plate-like members.

The present invention is applicable to an energy storage apparatus or the like provided with energy storage devices and an outer covering.

What is claimed is:

1. An energy storage apparatus, comprising:
   an energy storage device;
   an outer covering;
   an end plate which is disposed on a side of the energy storage device and is fixed to the outer covering; and
   a binding member which is mounted on the end plate and applies a binding force to the energy storage device,
   wherein the end plate includes:
      a first region on which the binding member is mounted;
      a second region which is fixed to the outer covering; and
      a third region which differs from the first region and the second region and has a higher rigidity than the first region and the second region,
   wherein the end plate includes a first plate member and a second plate member which overlap with each other in a first direction,
   wherein the first plate member projects from the second plate member in a second direction orthogonal to the first direction when the second plate member is viewed from the first direction, the first region is disposed at a position where the first plate member projects from the second plate member, and the third region is disposed at a position where the first plate member and the second plate member overlap with each other, and
   wherein the second plate member includes an overlapping portion which forms the third region by being made to overlap with the first plate member, and a flange portion which projects from the overlapping portion in the first direction and forms the second region.

2. The energy storage apparatus according to claim 1, wherein the second plate member includes a strip-like projecting portion which projects in the first direction on the third region.

3. The energy storage apparatus according to claim 2, wherein the third region is positioned between the first region and the second region in the second direction when the end plate is viewed from the first direction, and the projecting portion extends in the second direction in a strip shape on the third region.

4. The energy storage apparatus according to claim 2, wherein a number of fixing portions formed on the flange portion and a number of projecting portions are equal.

5. The energy storage apparatus according to claim 1, wherein the first plate member projects away from the energy storage device in the first region when the end plate is viewed in a cross section, and the first plate member projects so as to approach to the energy storage device in the third region.

6. The energy storage apparatus according to claim 1, wherein the outer covering includes a recessed portion recessed toward the end plate, and
   wherein the second region is disposed at a position corresponding to the recessed portion and is fixed to the recessed portion.

7. The energy storage apparatus according to claim 1, further comprising an insulating plate which is disposed between the energy storage device and the end plate,
   wherein the end plate comprises a metal.

* * * * *